Feb. 22, 1966  J. H. MILLER  3,235,934
OSCILLATORY NAPPING APPARATUS
Filed Sept. 11, 1963  4 Sheets-Sheet 1

Joe H. Miller
INVENTOR.

BY *Clarence A. O'Brien*
and *Harvey B. Jacobson*
Attorneys

Joe H. Miller
INVENTOR.

Feb. 22, 1966  J. H. MILLER  3,235,934
OSCILLATORY NAPPING APPARATUS
Filed Sept. 11, 1963  4 Sheets-Sheet 3
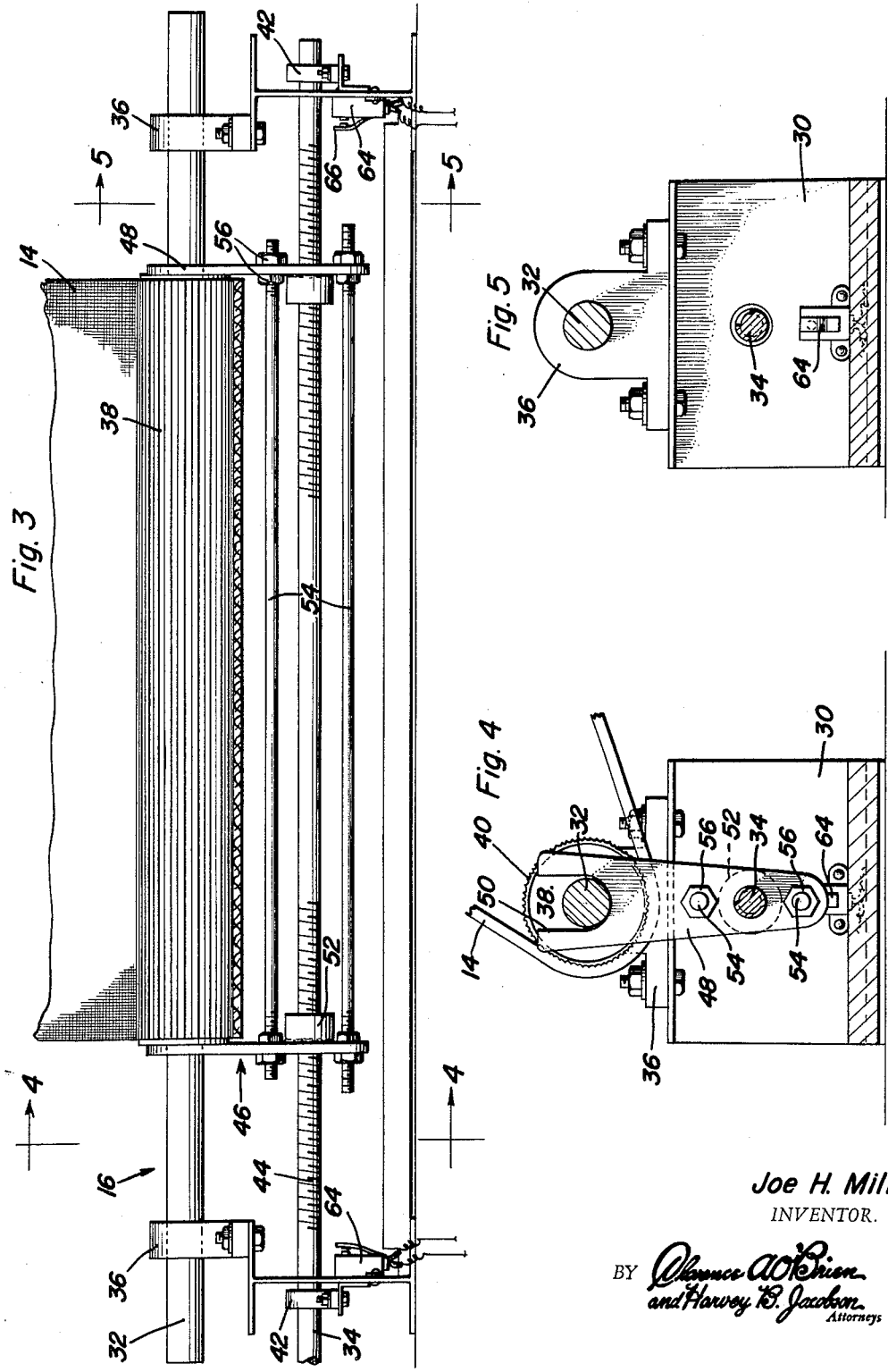
Joe H. Miller
INVENTOR.
BY Feb. 22, 1966 J. H. MILLER 3,235,934
OSCILLATORY NAPPING APPARATUS
Filed Sept. 11, 1963 4 Sheets-Sheet 4
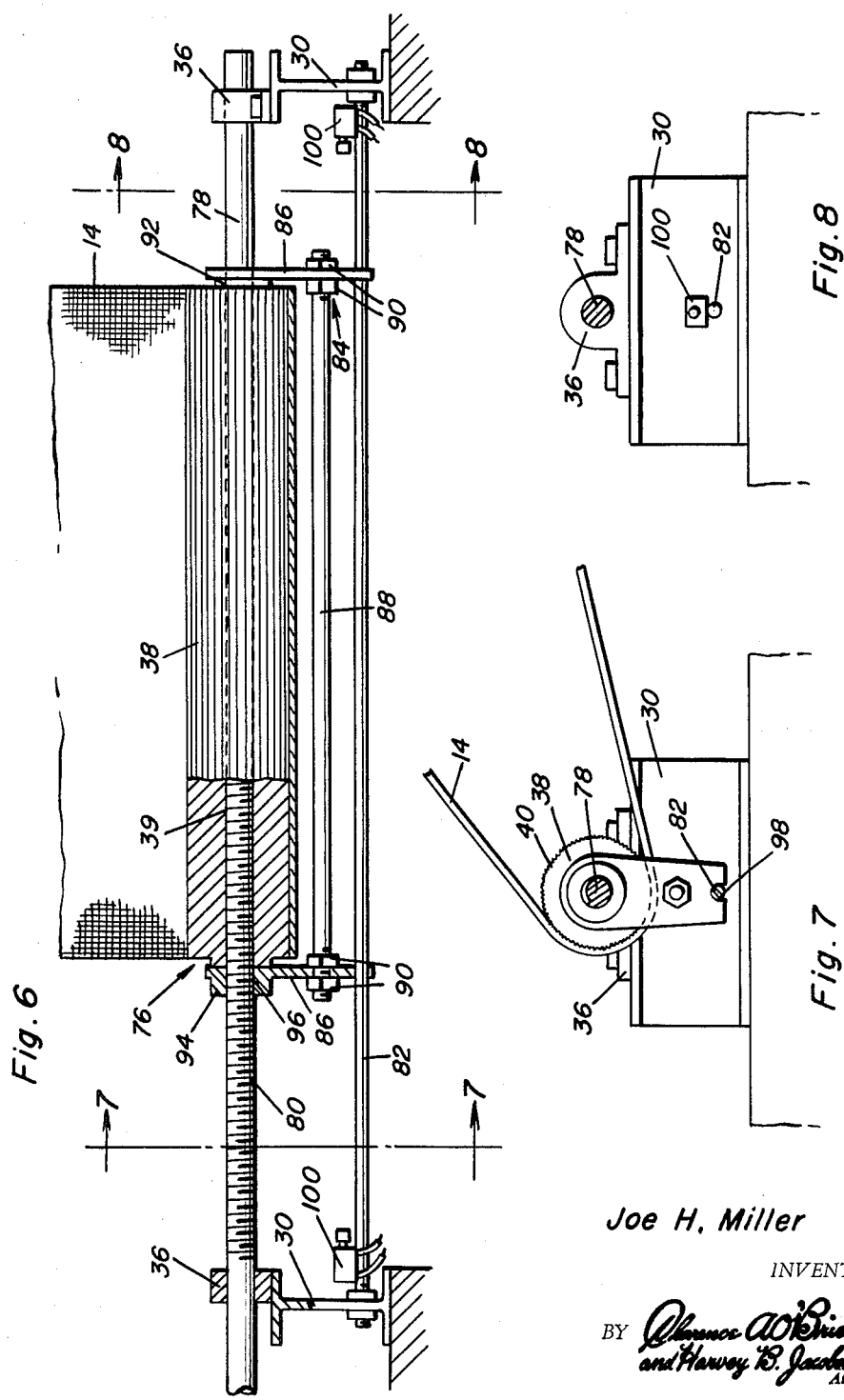
Joe H. Miller
INVENTOR.

United States Patent Office 3,235,934
Patented Feb. 22, 1966

3,235,934
OSCILLATORY NAPPING APPARATUS
Joe H. Miller, Black Mountain, N.C., assignor to Os-Nap, Inc., a corporation of North Carolina
Filed Sept. 11, 1963, Ser. No. 308,254
2 Claims. (Cl. 26—33)

This invention comprises a novel and useful oscillatory napping process and apparatus and more particularly pertains to an apparatus which is adapted to be operatively associated with a conventional napper machine for the purpose of axially shifting a fabric of less width than a napping drum of the machine across the entire axial extent of the drum to thereby obtain uniform wear of the napping rollers of the napper.

The present application constitutes a continuation-in-part of my prior copending application Serial No. 30,242 filed August 6, 1963 for Oscillatory Napping Process and Apparatus, now abandoned.

It frequently occurs that fabrics of considerably less width than the napping drum of a napper machine are required to be passed about the drum to thereby nap the fabric for various purposes. However, in conventional machines the narrower fabric passes continuously over the same portion only of the napping rollers of the machine thereby producing uneven wear of the rollers and their wire bristles and requiring replacement of the roller bristles or sharpening or grinding them to restore them to a uniform length and condition. The servicing operation is undesirable in that the napper machine is out of operation for a more or less considerable period of time while the necessary repairs are effected and further because of the expense involved in making such repairs and in the uneconomical feature of the necessity for discarding or servicing a napper roller in which a portion only of its napping surface has been utilized.

It has been known heretofore in an effort to overcome this problem to employ a modification of the conventional napper machine structure but providing for axial reciprocation of individual rollers on the napper drum in an effort to obtain a more uniform wear of the rollers and thus a longer life of the rollers when the napping machine is treating a fabric of substantially less width than the axial extent of the napping rollers and drum. However, such devices have been extremely costly owing to the addition thereto of mechanisms for effecting the axial shifting of the individual napping rollers of the napping drum.

It is therefore the primary purpose of this invention to provide an apparatus which will largely overcome the foregoing difficulties and disadvantages and will obtain the desired results of effecting a uniform and even wear of the bristles of the napping rollers by axially reciprocating the fabric across the entire extent of these rollers and to obtain this result without the necessity for any change whatsoever in the conventional napper machine including its napping drum and its napping rollers.

A further object of the invention is to provide a device in accordance with the foregoing objects which may be mounted separately from a napper machine and yet will be sufficiently juxtaposed with respect thereto and cooperatively associated therewith to effect a lateral shifting of the fabric across the entire axial extent of the napping rollers and napping drum.

A further object of the invention is to provide an attachment which may be readily introduced between a source of supply of fabric to be napped and the napping drum of a napper machine for effecting the uniform axial reciprocation or shifting of the fabric across the entire operating surfaces of the napper machine.

Still another purpose of the invention is to provide a reciprocating oscillatory feed roller together with an effective driving means therefor for imparting a laterally reciprocating movement to the fabric prior to its being fed to the napping drum of the napper machine.

Yet another purpose of the invention is to provide an oscillatory napping apparatus having improved mechanism for rotatably journalling for axial shifting movement a fabric feeding oscillatory roller together with means for imparting axial reciprocating motion to the oscillatory roller.

Still another purpose of the invention is to provide a device in accordance with the preceding objects in which the driving means for the oscillatory roller may be readily adjusted to vary both the extent and the position of reciprocating movement imparted to the oscillatory roller whereby the device may be readily adapted to different napper machines.

An additional specific object of this invention is to provide an apparatus in accordance with the preceding objects wherein the shaft upon which the oscillating roller is freely rotatable and slidable shall constitute a feed shaft for reciprocatingly shifting a fork with the oscillatory roller thereon.

A still further object of the invention is to provide an apparatus in accordance with the immediately preceding object which shall reduce the number of elements required for this apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a detailed view in vertical transverse section taken upon an enlarged scale substantially upon the plane indicated by section line 3–3 of FIGURE 2 and showing in particular the mounting and the driving mechanism of the oscillatory roller of the invention;

FIGURES 4 and 5 are vertical transverse sectional views taken substantially upon the plane indicated by section lines 4—4 and 5—5, respectively, of FIGURE 3 and showing further details of the fabric oscillating device in accordance with this invention;

FIGURE 6 is a view similar to FIGURE 3 but showing a simplified embodiment of the invention;

FIGURE 7 is a view in vertical transverse section taken substantially upon the plane indicated by the section line 7—7 of FIGURE 6; and FIGURE 8 is a further detail view in vertical transverse section taken substantially upon a plane indicated by section line 8—8 of FIGURE 6.

Reference is now made first to FIGURES 1–5, which correspond to and are duplicates of the correspondingly numbered figures of my copending application and which refer to a first embodiment of the invention.

Figure 1:
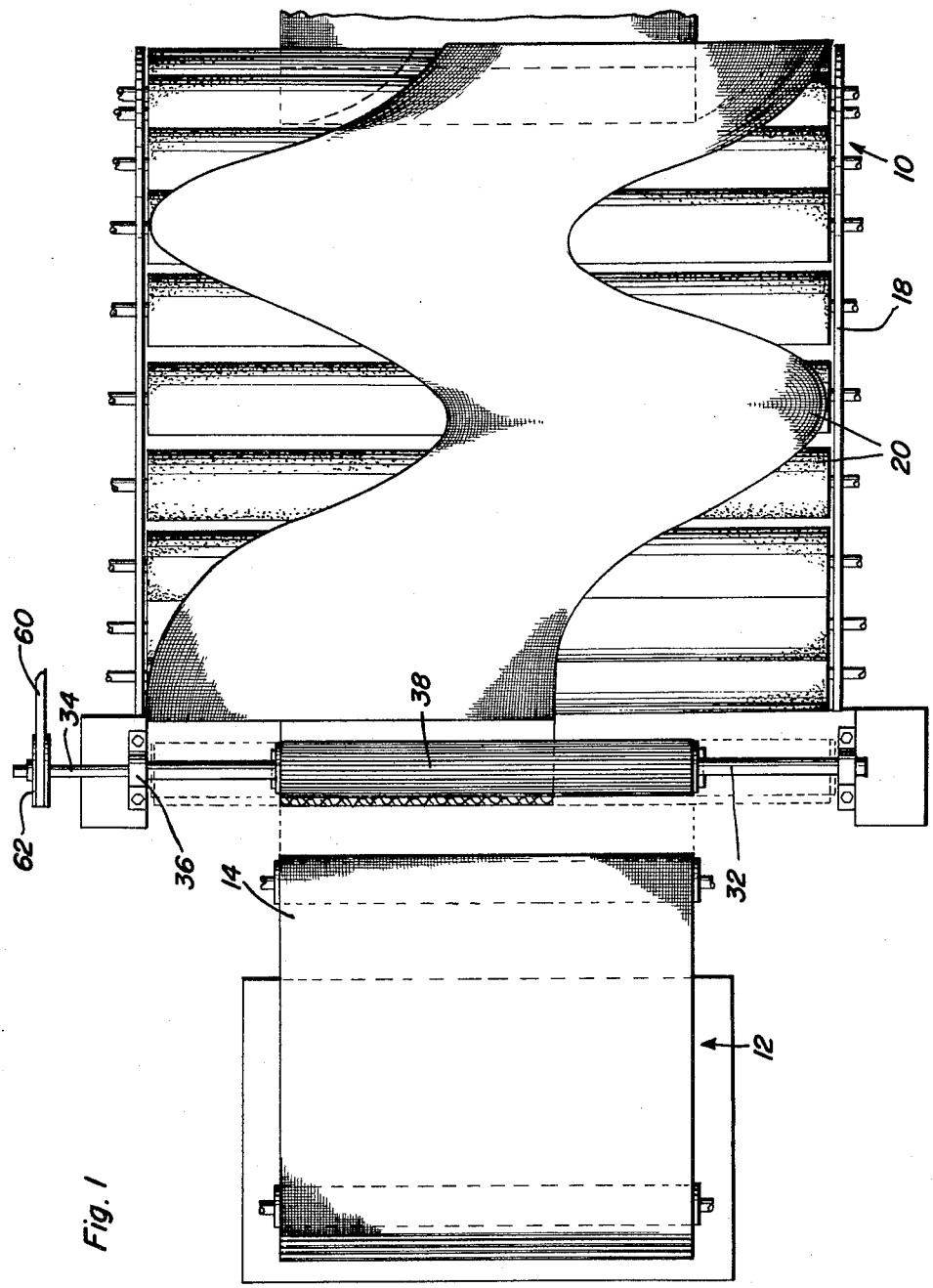
FIGURE 1 is a view in top plan showing the present invention applied to a conventional napper machine, the view being somewhat diagrammatic.
Figure 2:
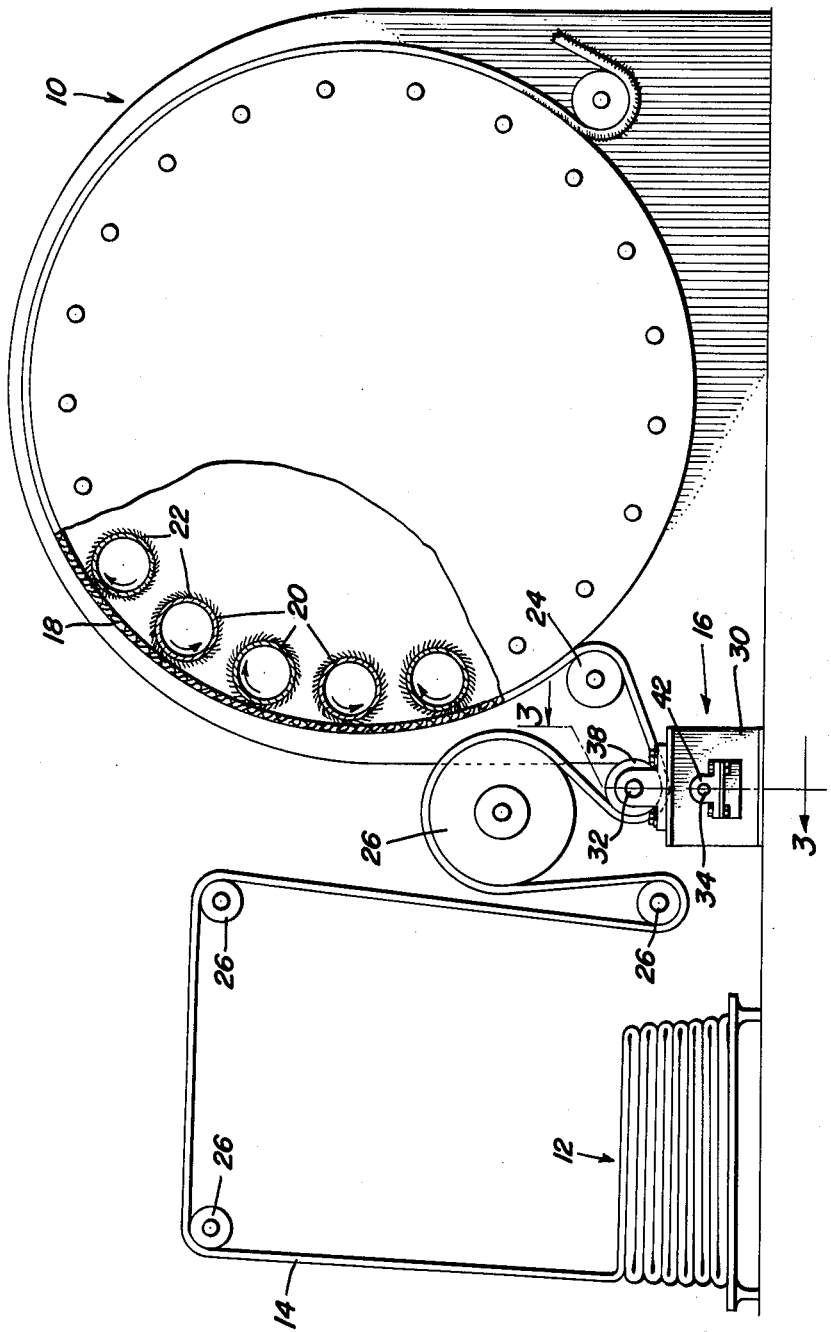
FIGURE 2 is a side elevational view of the arrangement of FIGURE 1, parts being broken away and shown in vertical section.

Referring now primarily to FIGURES 1 and 2, it will be observed that the numeral 10 designates generally any conventional type of napper machine while the numeral 12 indicates generally any suitable source of a fabric 14 which is to be napped by the machine 10. Indicated at 16 is the reciprocating or oscillatory device interposed between the fabric supply 12 and the napper machine 10 for effecting a lateral shifting of the fabric 14 as the latter is fed to the napper machine.

With continuing reference to FIGURES 1 and 2 it will be observed that the conventional napper machine includes the customary napping drum 18 which is suitably journalled in the usual manner, not shown, for rotation about a horizontal axis. Mounted upon the drum are a series of circumferentially spaced napping rollers 20 which likewise are adapted to be rotated about their own axes which lie in side-by-side relation about the circumference of the drum. The napping rollers 20 are of any customary design, including a covering 22 of a napping cloth containing wire bristles and the like. These rollers project beyond the circumference of the drum and constitute a revolving napping surface of wire bristles over which the fabric 14 is adapted to pass during its passage over the napping drum.

A power driven drive roller 24 is suitably mounted and powered from any suitable source, not shown, and draws the fabric through the device 16 from the source of supply 12 and presses the fabric against the lower portion of the circumference of the napping drum 18. The customary idler or guide rollers as at 26 are provided which guide the fabric during its travel from the source of supply 12 to the oscillating device 16 from whence the drive roller 24 draws the fabric and deposits it upon the surface of the napping drum in a manner well understood by those skilled in the art.

Reference is now made specifically to FIGURE 3 for an understanding of the structure and operation of the reciprocating or oscillating device 16. The oscillator device consists of a cabinet 30 or any other suitable support means upon which are rotatably mounted a roller shaft 32 together with a drive shaft 34 in parallel relation thereto. The roller shaft 32 is carried in end bearings 36 suitably mounted upon the support 30 and the shaft 32 is rotatably and axially movable in these bearings. Detachably fixed and secured to the shaft in any desired manner is the oscillatory roller 38 which is of any suitable construction and is fixed to the shaft 32 for rotation and axial movement therewith. Conveniently, the roller 38 may be provided with a coating 40 of any suitable material and preferably serrated or corrugated in nature in order to provide a non-slipping engagement with a fabric 14 passed thereabout.

The drive shaft 34 is likewise journaled in suitable bearings as at 42 upon the support structure 30, it being mounted for rotation but held against axial slipping movement in any suitable manner. The shaft 34 is threaded or provided with a worm or screwthread 44 and a shifting carriage indicated generally by the numeral 46 is threadedly engaged upon this shaft for support thereby and for axial movement therealong.

The shifting carriage 46 preferably includes a pair of end plates 48 each of which comprises a yoke having a notched or forked portion 50 at its upper end which loosely straddles the shaft 32 and bears against the extremity of the roller 38. Secured to the plates 48 are internally threaded hubs 52 which are engaged upon the worm 44. Adjusting and stabilizing rods 54 provided with adjusting nuts 56 at each end thereof are secured to the plates 48 through suitable apertures therein and serve to rigidly but adjustably and releasably maintain the yokes 48 in fixed relation so that they will in turn embrace the opposite extremities of the oscillator roller 38.

As so far described it will now be apparent that upon rotation of the drive shaft 34, the shifting carriage 46 will in turn axially shift the roller 38 and the roller shaft 32 fixed thereto. Since the fabric 14 has a non-slipping engagement of the surface with the roller 38, the fabric in turn will be shifted axially in a reciprocating manner as suggested in FIGURE 1 so that the fabric will be fed progressively across substantially the entire axial extent of the napping rollers of the napping drum or any desired portion of such axial extent.

The rate of the reciprocating or axial shifting of the oscillatory roller 38 is determined by the speed of rotation imparted to the drive shaft 34. Any suitable source of power may be provided for the shaft, as for example as suggested in FIGURE 1 the belt 60 driven from any suitable source either independent of or connected to the power source of the napper machine, through the pulley 62 imparts rotation to the drive shaft 34. Conveniently, an electric motor may be employed to impart rotation to the drive belt 60 and the invention contemplates the provision of limit or reversing switches 64 each mounted upon the support frame at opposite sides of the oscillator roller and so positioned that their switch contacts 66 may be engaged by some portion of the shifting carriage 46 as for example one of the rods 54. Inasmuch as the present invention is not directed to the details of the reversing switch and limit switch assembly, which may be of any conventional well-known design, a further description thereof is deemed to be unnecessary. It will be understood that when the oscillator roller has reached one end of its travel whereby the fabric has been shifted the desired extent axially across the napping rollers of the napping drum, a switch will be actuated to reverse the operation of the driving means and thus cause a shifting carriage 46 and the oscillatory roller 38 attached thereto to move in the other direction. It is evident that suitable adjustment of he limit switch mechanism will enable the extent of the shifting movement to be readily adjusted, both as to over-all extent and as to its orientation with respect to the width of the napping rollers and drum. Further, the adjustability of the fastening means 54 enables the shifting carriage to be readily applied to the different sizes or lengths of oscillator rollers 38. Thus the device is readily adjusted to different sizes of napper machines.

It will be observed that the present invention envisions a method quite distinct from that in conventional practice in that a conventional napper machine without alteration is so operated as to utilize the full actual extent of its napping rollers thereby uniformly distributing wear thereon regardless of the width of the fabric to be napped.

Attention is now directed to a second and simplified embodiment of an oscillatory napping apparatus in accordance with this invention as disclosed in FIGURES 6–8. While the apparatus is similar in principle to the structure and operation of the embodiment of FIGURES 1–5, it possesses a simplified arrangement of the mounting and operation of the oscillatory roller. Accordingly, the same numerals have been employed to designate the same elements which are employed in the preceding embodiment of FIGURES 1–5.

Indicated generally by the numeral 76 is the reciprocating or oscillatory device which as in the preceding embodiment is interposed between the fabric supply and the napper machine, shown in FIGURE 1. As in the preceding embodiment, the oscillatory device effects a lateral shifting of the fabric 14 back and forth transversely of the napper machine as the fabric is fed to the rolls of the latter.

The oscillating roller 38 has a bore 39 therethrough by which it is loosely mounted upon the shaft 78 for both free rotary and sliding movement thereon. The shaft 78 corresponds to the shaft 32 except that it is externally threaded as at 80 at one end thereof for a purpose to be subsequently apparent. This shaft is likewise journaled in the bearings 36 which are supported on a cabinet or framework 30 of the apparatus.

Secured to and extending between the opposite sides of the framework or cabinet 30 is a transverse bar 82 forming a guide rail. A shifting carriage constituting a shifting fork is indicated generally by the numeral 84 and corresponds to the carriage 46 of the preceding embodiment. This carriage likewise consists of a pair of parallel plates 86, which are rigidly connected together by a transverse adjusting or stabilizing rod 88 corresponding to the rods 54. This rod likewise has adjusting nuts 90 thereon by which the spacing between the plates 86 may be accurately adjusted.

As will be observed, the plates 86 have laterally projecting bushings 92 and 94 thereon which are received upon the shaft 78. The bushing 92 is freely slidable upon the shaft 78 while the bushing 94 is internally threaded as at 96 for engagement upon the external threads 80 at one end portion of the shaft. It will thus be observed that upon rotation of the shaft 78, the threaded portion 80 will by its coaction with the bushing 94 effect corresponding axial travel of the carriage 84. Inasmuch as the two plates engage the opposite ends of the roller 38, the roller itself will likewise be axially shifted upon the shaft 78 in correspondence with movement of the carriage 84.

The lower ends of the plates 86 are notched as at 98 for sliding engagement upon the guide rail 82.

It will thus be apparent that the carriage is guidedly carried by the shaft 78 by which it is also driven and by the guide rail 82, with the plates 86 being rigidly secured together in adjustably spaced position by the adjusting rod 88. The shaft 78 thus serves both to support for rotary and sliding movement the oscillating roller 38 and also to impart reciprocatory movement to the carriage which in turn shifts this roller. In this form of the invention the number of shafts have thus been reduced to three while enabling the free oscillatory sliding movement of the roller upon its supporting shaft 78.

As will be noted from FIGURE 6, a pair of limit switches each indicated by the numeral 100 and which correspond in function to the switches 64 and 66 of FIGURE 3, are suitably mounted as upon the guide rail 82 adjacent the opposite ends of the shaft 78. These switches form a part of the electric circuit of the reversing motor, not shown, which imparts rotation to the shaft 78, and are adapted to be engaged by the end plates 86 of the carriage at opposite extremes of their stroke in order to reverse the motor and thus the direction of rotation of the driving shaft 78.

The operation of this form of the invention is identical with that previously described and a further description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In combination with a napper apparatus of the type including a rotatable napping drum with a napping surface thereon for receiving a fabric to be napped of a lesser width than the axial extent of said napping surface and moving from a fabric source to said drum and across said napping surface, an adjustable fabric oscillating device disposed between the fabric source and said drum for engaging and shifting the fabric transversely of the fabric line of movement to said drum to thereby progressively feed the fabric directly to the napping surface across a desired axial extent thereof which is greater than the fabric width whereby to distribute the wear of said napping surface more uniformly across the axial extent of the latter, said device comprising a threaded shaft mounted for rotation, an axially oscillating fabric feed roller freely rotatably mounted on said shaft and having both rotary and axial reciprocatory movement, a guide rail mounted parallel to and adjacent said threaded shaft, a shifting carriage mounted upon said shaft and rail for guided reciprocatory sliding movement, said shifting carriage having arms engaging the opposite ends of said roller and embracing said shaft and effecting axial reciprocation of said roller upon reciprocation of said shifting carriage, one of said arms on the shifting carriage being threadedly connected to said threaded shaft and effecting reciprocation of said shifting carriage upon reverse rotations of said threaded shaft, and means connected with said threaded shaft for reversely rotating said shaft.

2. In combination with a napper apparatus of the type including a rotatable napping drum with a napping surface thereon for receiving a fabric to be napped of a lesser width than the axial extent of said napping surface and moving from a fabric source to said drum and across said napping surface, an adjustable fabric oscillating device disposed between the fabric source and said drum for engaging and shifting the fabric transversely of the fabric line of movement to said drum to thereby progressively feed the fabric directly to the napping surface across a desired axial extent thereof which is greater than the fabric width whereby to distribute the wear of said napping surface more uniformly across the axial extent of the latter, said device comprising a roller shaft, an axially oscillating fabric feed roller supported by said roller shaft and having both rotary and axial reciprocatory movement therewith, a threaded drive shaft supported in parallel and adjacent relation to said roller shaft, a shifting carriage mounted upon said roller shaft and said threaded drive shaft for guided reciprocatory movement, said shifting carriage having arms engaging the opposite ends of said roller and embracing said roller shaft and effecting axial reciprocation of said roller upon reciprocation of said shifting carriage, said arms on the shifting carriage being threadedly connected to said threaded drive shaft and effecting reciprocation of said shifting carriage upon reverse rotations of said threaded drive shaft, and means connected with said threaded drive shaft for reversely rotating said threaded drive shaft.

References Cited by the Examiner

UNITED STATES PATENTS

| | | | |
|---|---|---|---|
| 376,417 | 1/1888 | Rogers. | |
| 437,715 | 10/1890 | Ott | 26—36 |
| 459,353 | 9/1891 | Wood | 26—36 |
| 462,697 | 11/1891 | Gessner | 26—34 |
| 561,220 | 6/1896 | Gessner | 26—33 X |
| 2,076,421 | 4/1937 | Wood | 226—179 |
| 2,117,079 | 5/1938 | Bulford | 26—29 |
| 2,129,707 | 9/1938 | Runton | 26—29 |
| 2,365,322 | 12/1944 | Ashworth | 226—179 |
| 2,773,391 | 12/1956 | Bruestle | 242—158.4 X |
| 2,845,229 | 7/1958 | Bliss | 242—158.4 X |
| 2,959,372 | 11/1960 | Sadorf | 242—158.4 |

DONALD W. PARKER, *Primary Examiner.*